G. A. JOYCE.
MOLDING OF THE METAL MOUNTS OF DIAMOND TOOLS.
APPLICATION FILED MAY 12, 1919.

1,314,814.

Patented Sept. 2, 1919.

Inventor
George Albert Joyce
By his Attorney

UNITED STATES PATENT OFFICE.

GEORGE ALBERT JOYCE, OF LONDON, ENGLAND.

MOLDING OF THE METAL MOUNTS OF DIAMOND-TOOLS.

1,314,814. Specification of Letters Patent. Patented Sept. 2, 1919.

Application filed May 12, 1919. Serial No. 296,722.

*To all whom it may concern:*

Be it known that I, GEORGE ALBERT JOYCE, a subject of the King of Great Britain and Ireland, and a resident of London, England, have invented certain new and useful Improvements in or Connected with Molding of the Metal Mounts of Diamond-Tools, of which the following is a specification.

This invention relates to improvements in or connection with the molding of the metal mounts of diamond tools.

Heretofore it has usually been the practice to hold the diamond in position during casting by a fusible element extending up through a slit or recess in the base of the mold or in other ways to so support the diamond that its point protrudes from the casting in which it becomes embedded. The fusible element when utilized has been in the nature of an imperforate metallic sheet. Serious objections are incident to such practice due to various causes. For instance the contraction of the metal mount from the base of the mold due to cooling will frequently expose an undue proportion of the stone and as a consequence the latter will be held imperfectly in the mount. Also when an imperforate metallic sheet is utilized for the fusible holder the metal when poured first has to melt this sheet with the result that the metal may not actually reach the entire surface of the stone to be set. In this way air holes will form in the mount and the stone will not be securely held.

The objects of the invention are to so mount the stone that it will be substantially completely incased in the mount to insure that the molten metal shall come in contact with the surface of the stone without destroying the "skin" or surface layer thereof and to permit of the ready adjustment and positioning of the stone in the mold according to requirements.

In carrying out the above and other objects of the invention I employ supporting means which hold the stone in spaced relation from the base of the mold and for permitting metal to flow to substantially entirely surround the stone. Such supporting means here takes the form of a holder depending from the top of the mold capable of adjustment so as to insure that the stone to be mounted may be embedded in the finished casting at any desired angle or position in the same the supporting medium also including a fusible element of a foraminous character such as wire mesh between the holder and the stone which permits the metal to make a hit and miss contact with the stone to reach all parts of the surface thereof without destroying the "skin" and to entirely incase the stone.

In the accompanying sheet of illustrative drawings Figure 1 is a sectional elevation of a mold embodying the invention.

Figure 1:
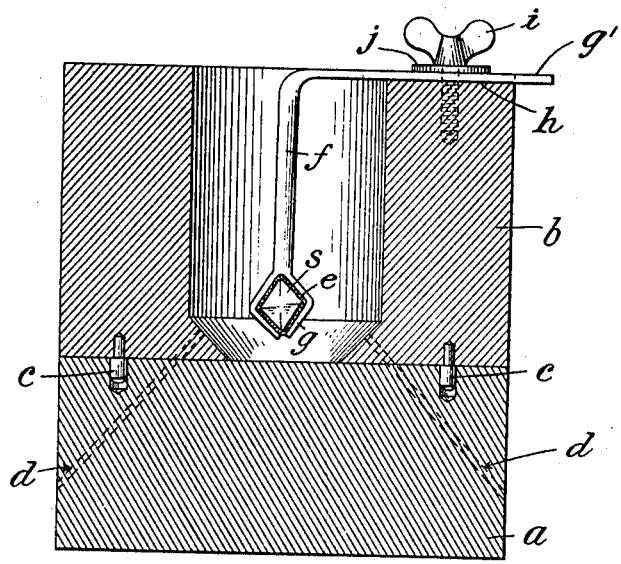
Figure 2:
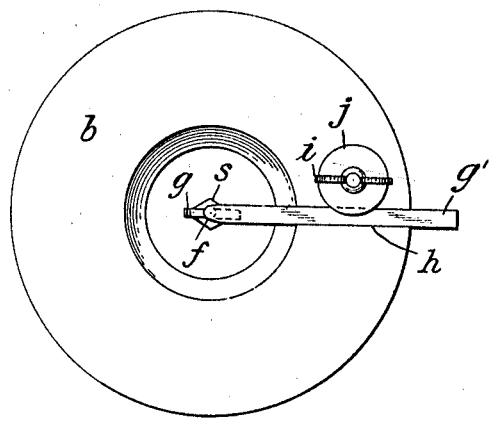
Fig. 2 is a plan.
Figure 3:
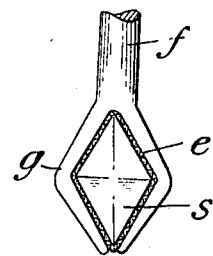
Fig. 3 is a detail view.

The mold as illustrated comprises a cylindrical base $a$ and an upper portion $b$ positioned on the base by studs $c$ suitable air vents $d$ being provided at the bottom of the mold as indicated by dotted lines. A fusible element $e$ of woven wire or the like incloses the stone $s$ but is shown in section in Figs. 1 and 3 for greater clearness.

The depending holder for the stone is conveniently formed of a rod $f$ shaped at its lower end in the form of a double claw $g$ and bent at right angles at its upper end to form an arm $g'$ which lies in a radial groove $h$ in the top of the mold where it is adjustably clamped by a clamping screw $i$ and washer $j$. When the metal is poured into the mold it passes under the claw of the holder $g$ which supports the stone within the fusible foraminous element $e$ with the result that the stone $s$ is entirely incased in the metal while the fusible element $e$ is melted the surplus metal being afterward cut away to expose the stone as required.

I claim:

1. Casting apparatus for setting stones comprising: a mold having a mold chamber provided with a substantially closed bottom, and means adjacent the upper end of mold for supporting a stone to be set in pendent relation within said chamber.

2. Casting apparatus for setting stones comprising: a mold having a mold chamber provided with a substantially closed bottom and open top, a bent arm supported at the top of the mold and extending into said chamber, and means at the lower end of said arm for supporting a stone to be set.

Signed at the city of London, England, in the Kingdom of Great Britain and Ireland, this 29th day of May, 1919.

GEORGE ALBERT JOYCE.